Dec. 24, 1935.　　　H. MEREDITH-JONES　　　2,025,515
ELECTRIC OVEN
Filed Sept. 5, 1933　　　2 Sheets-Sheet 1

INVENTOR.
HUBERT MEREDITH JONES
BY
*Gustav P. Thompson*
ATTORNEY

Dec. 24, 1935.  H. MEREDITH-JONES  2,025,515
ELECTRIC OVEN
Filed Sept. 5, 1933  2 Sheets-Sheet 2

INVENTOR.
HUBERT MEREDITH JONES
BY
ATTORNEY

Patented Dec. 24, 1935

2,025,515

UNITED STATES PATENT OFFICE 2,025,515

ELECTRIC OVEN

Hubert Meredith-Jones, New York, N. Y.

Application September 5, 1933, Serial No. 688,089

8 Claims. (Cl. 219—35)

This invention relates to electrically heated ovens, and provides improvements therein.

The invention provides a structure and arrangement by which the oven atmosphere may be brought up to the desired temperature in a relatively short time, and may be maintained quite even throughout the oven; and in which the heat from the electrical heaters is most advantageously and economically utilized. These features of the invention applied to domestic cooking ovens, provide a greatly improved oven of that character.

A domestic cooking oven conforming to usual standard dimensions, made in accordance with this invention, and with its economical utilization of electrical energy, may be connected to an outlet of the ordinary household wiring-system, special wiring, incidental to the large currents required for the ordinary electrically heated ovens, not being necessary. The electrical heaters are advantageously of a type which are replaceable and widely available on the market. A broadened market or field for electric ovens is opened.

In my invention I make use of the novel principle of confining and concentrating the heat from the electric heaters, in whatever form this is emanated,—wave-motion, electronic, corpuscular, and conductive,—at the vicinity of and upon a stream of air circulating past the heaters to and from the oven. The economy of electrical energy in effecting the heating of a given size oven I attribute to the fact that the radiant energy (in various forms) from the heaters is not allowed to distribute to various parts (walls etc.) of the oven, but is confined and concentrated at the heaters, virtually all of the energy being converted there to heat and imparted to the stream of air circulating past the heaters,—which air is really the matter which it is desired primarily to heat.

An embodiment of the invention is illustrated in the accompanying drawings, in which.

Figure 1:
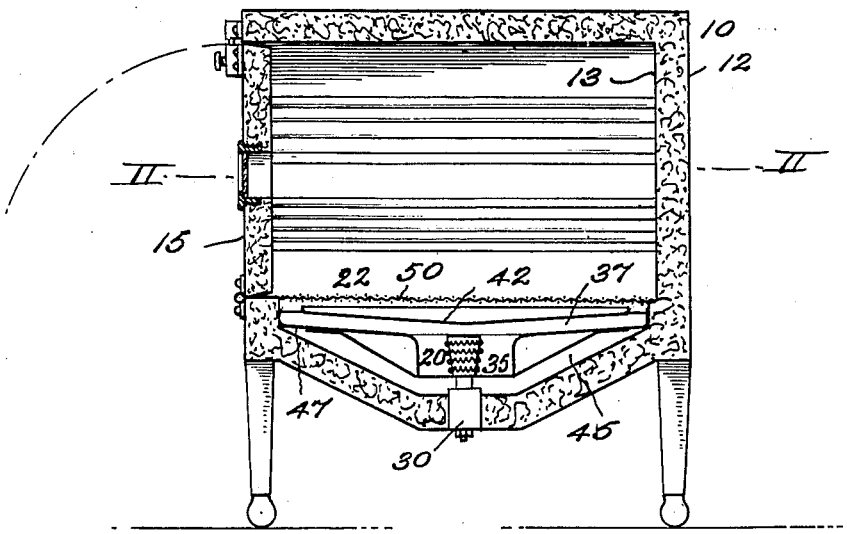
Fig. 1 is a transverse vertical section through said embodiment.
Figure 2:
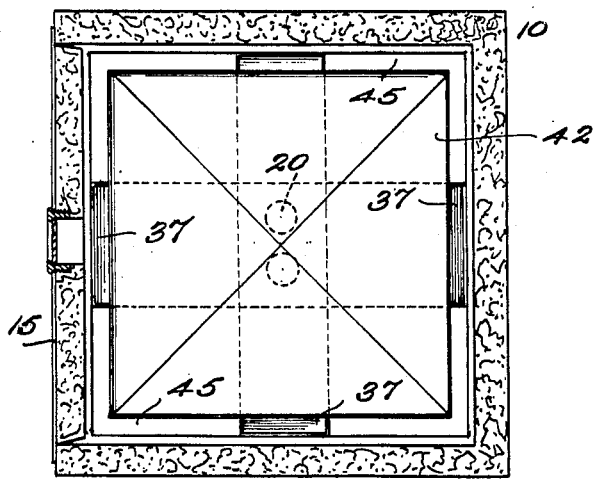
Fig. 2 is a horizontal section of the same on the line II—II Fig. 1.

Referring to said drawings, numeral 10 designates the oven, which is conveniently formed of double walls 12 and 13, with suitable insulation in between and provided with a door 15. Numeral 18 designates an adjustable shelf such as usually found in domestic cooking ovens.

Numeral 20 designates the electrical heating means and numeral 22 designates a means for confining and concentrating the heat from the electric heaters at the vicinity of and upon a stream of air circulating past the heaters.

The electrical heaters 20 preferably comprise one or more lengths of resistance wire 24 so arranged as to occupy a small space. The wire 28, for example, is coiled, and the coiled wire wound around a porcelain support 26 in adjacent spirals. The support is preferably provided with means, as a threaded plug 28, for detachable connection with a socket 30, conveniently supported on the bottom wall of the oven. The electric heater and its support constitute a replaceable unit, and is preferably, as illustrated, of a form which is a stock article and readily procurable upon the market. One or more of these electric heaters may be provided. Two are here shown.

The concentrating means 22 comprises a wall 33 adjacent and surrounding the electrical heater or heaters 20, and providing between said wall and the heater a passage 35 for the circulation of air within the oven. The wall 33 confines and concentrates the heat from the electric heaters, in whatever form the heat emanates, whether in the form of waves, electrons, corpuscles or conducted heat, at the vicinity of and upon the stream of air which flows through the passage 35 between the said heaters and said wall 33. The energy emanating from the heater in said passage is reflected back and forth, and my theory of the exceptional results obtained by the use of my invention is that the heating of the air in the passage is effected in large measure by the impact of the energy-form or forms which emanate from the heater upon the air particles, in contra-distinction to the heating of the air by conduction from surfaces heated by the energy which emanates. The energy-forms reflected back and forth in the passage have a multiple effect in their impact on the air particles. The top of passage 35 preferably communicates with lateral passages 37 which lead the heated air to the sides of the oven, and thus distribute the heated air in the oven. The lower part of the wall 33 is conveniently raised above the bottom wall of the oven as indicated at 39 so that air at lower temperature may enter said passage 35 at the bottom. A plate 42 is preferably placed over the passage 35, and is conveniently so arranged as to form the upper wall of the passages 37. The plate 42 is also preferably dished, so as to catch liquids spilled in cooking, and thereby protect the heaters. The edges of the plate 42 are spaced from the sides of the oven, so that the passages 37 may open into the oven, and also to enable air to pass downwardly through passage 45 between the lower wall of the oven and the underside of the plate 42 and of plates 47 which form the underside of passages 37.

Figure 3:
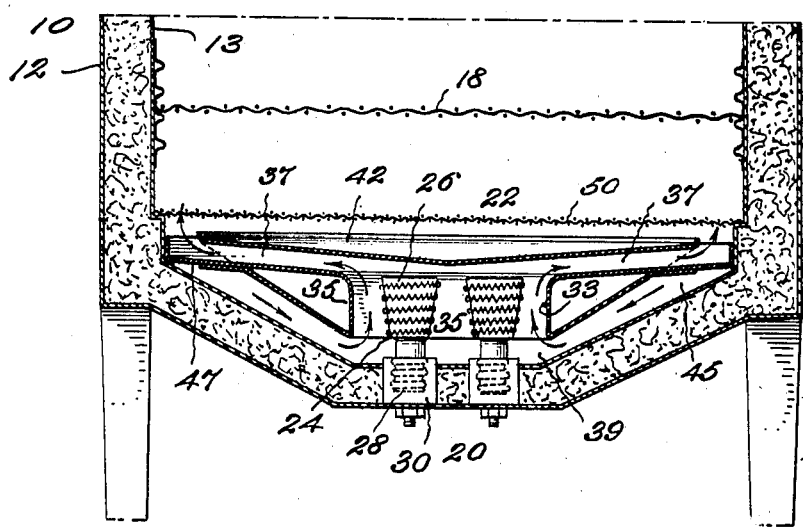
Fig. 3 is a longitudinal vertical section drawn on an enlarged scale.
Figure 4:
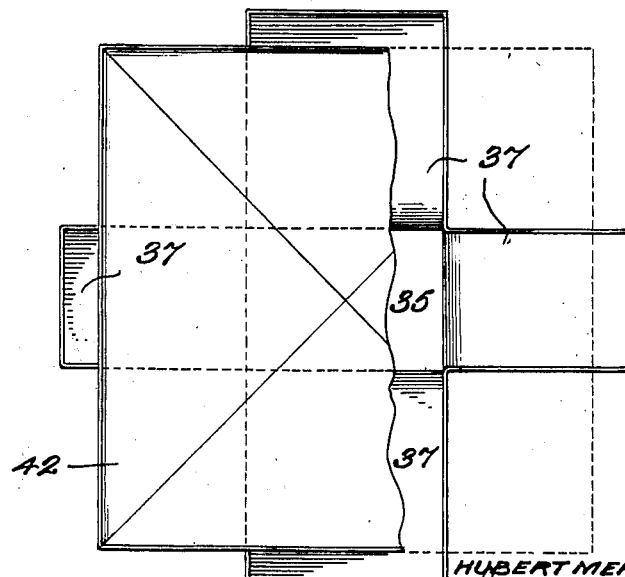
Fig. 4 is a top plan view with parts partly broken away illustrating one of the features in detail.

The circulation of the air through passage 35 is indicated by the arrows Fig. 3, and is from said passage 35, through passages 37 to the sides of the oven into the oven, then from the oven down over the edges of plate 42, through the passage 45 into the lower part of passage 35, where the circulating air is reheated.

The plates 47 forming parts of the passages 37, the plate 42, and the wall 33, are conveniently formed as a unit, which may be lifted from the bottom of the oven and removed, to facilitate replacement of the heating element or elements 20, and cleaning.

I have found an advantage in having the area through passage 35 somewhat less at the top, than at the bottom. The inverted conical supports 26 and the space surrounded by straight walls, provide such a restriction at the top of the passage 35. The restriction retards the flow of the air in the passage 35 opposite the heating wires 24, so that the bombardment or impact of the air particles by the energy-forms which emanate, referred to above, is prolonged.

A screen 50 may be placed over the plate 42 to catch solids which may be dropped.

It is found that by use of the invention very uniform temperature may be maintained in the oven, and that the oven atmosphere may be raised to a given cooking temperature in a materially shorter time, and with the consumption of less watts, than with electrical ovens with which I am acquainted and heretofore in use.

Moreover by the reduction in energy required for the heaters, I am enabled to provide an electric oven of the standard size, and plug the heaters into a socket of the ordinary household wiring system, and avoid the necessity of providing a special wiring for the oven. The ability to use the oven on the ordinary household wiring system is a material inducement to the use of electric cooking ovens.

The invention may be applied to other uses than domestic cooking ovens.

The invention may receive other embodiments than that herein specifically illustrated and described.

What is claimed is:

1. In combination, an oven in which the air is to be brought to a relatively high temperature, an electric heater therein, means for confining and concentrating the heat from the electric heater, at the vicinity of, and upon a stream of air circulating past the heaters, said means comprising a tubular air duct open at each end to the oven space, spaced from and independent of the walls of the oven, surrounding said heater, and having its outlet into the lower part of the oven, said heater being so located and arranged with relation to said tubular passage that the radiant energy from said heater is largely confined within and converted to heat energy within said tubular air-duct, thereby concentrating the energy transformation and heat-transfer to a very large extent within said air-duct.

2. A combination according to claim 1, wherein the area of said tubular air-duct is less at the exit than at the entrance.

3. A combination according to claim 1 in which said heater comprises a resistance-wire the length of which is condensed by winding and occupying a concentrated space in said tubular air-duct, the walls of said tubular air-duct acting to reflect the emanations or waves back toward said heater.

4. A combination according to claim 1, in which said passage is formed as part of a unit removable from a position around said heater.

5. A combination according to claim 1, and further comprising lateral air-ducts connecting said first named tubular air-duct with the lower part of the interior of said oven near the side walls.

6. A combination according to claim 1, and further comprising lateral air-ducts connecting said first named tubular air-duct with the lower part of the interior of said oven near the side walls, and a plate in the lower part of the oven above said tubular air-duct, and having its edges adjacent the side walls of the oven.

7. A combination according to claim 1, and further comprising lateral air-ducts connecting said first named tubular air-duct with the lower part of the interior of said oven near the side walls, said oven having a depressed bottom, and means supporting said air-ducts spaced from the bottom of the oven.

8. A combination according to claim 1, in which said heater comprises a plurality of cylindrical supports arranged in close proximity to one another and to the walls of the tubular air-duct and in line with the axis of the tubular air-duct, and having resistance-wire coiled around said supports.

HUBERT MEREDITH-JONES.